US006407983B1

(12) United States Patent
Zheng et al.

(10) Patent No.: US 6,407,983 B1
(45) Date of Patent: Jun. 18, 2002

(54) CIRCUIT AND METHOD FOR SHAPING TRAFFIC IN A VIRTUAL CONNECTION NETWORK

(75) Inventors: Dan Zheng; Michael A. D'Jamoos, both of Plano; George N. Frank, Irving; Mikio S. Ichiba, Allen, all of TX (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/026,837

(22) Filed: Feb. 20, 1998

(51) Int. Cl.[7] .......................... G01R 31/08; H04L 12/28
(52) U.S. Cl. .................... 370/232; 370/395.41
(58) Field of Search .............................. 370/230, 230.1, 370/232, 376, 462, 458, 391, 375, 321, 395.41

(56) References Cited

U.S. PATENT DOCUMENTS

| | | | |
|---|---|---|---|
| 4,677,611 A | 6/1987 | Yamosy, Jr. et al. | 370/85 |
| 5,070,498 A | 12/1991 | Kakuma et al. | 370/60 |
| 5,280,475 A | 1/1994 | Yanagi et al. | 370/60 |
| 5,390,164 A | 2/1995 | Kremer | 370/16.1 |
| 5,390,194 A | 2/1995 | Kremer | 370/16.1 |
| 5,394,389 A | 2/1995 | Kremer | 370/16.1 |
| 5,414,816 A | * 5/1995 | Oyadomari | 395/275 |
| 5,515,363 A | 5/1996 | Ben-Nun et al. | 370/17 |
| 5,537,411 A | 7/1996 | Plas | 370/85.1 |
| 5,557,611 A | 9/1996 | Cappellari et al. | 370/60.1 |
| 5,583,849 A | 12/1996 | Ziemann et al. | 370/397 |
| 5,612,959 A | 3/1997 | Takase et al. | 370/390 |
| 5,636,215 A | 6/1997 | Kubo et al. | 370/397 |
| 5,673,262 A | 9/1997 | Shimizu | 370/395 |
| 5,684,800 A | 11/1997 | Dobbins et al. | 370/401 |
| 5,754,528 A | 5/1998 | Uchida | 370/222 |
| 5,774,662 A | 6/1998 | Sakagawa | 395/200.33 |
| 5,805,820 A | 9/1998 | Bellovin et al. | 395/200.55 |
| 5,838,663 A | 11/1998 | Elwalid et al. | 370/233 |
| 5,842,038 A | * 11/1998 | Williams et al. | 395/825 |
| 5,852,606 A | 12/1998 | Prince et al. | 370/393 |
| 5,892,912 A | 4/1999 | Suzuki et al. | 395/200.48 |
| 5,912,891 A | 6/1999 | Kanai | 370/395 |
| 5,978,356 A | 11/1999 | Elwalid et al. | 370/230 |

FOREIGN PATENT DOCUMENTS

EP 0818940 1/1998 ........... H04Q/11/14

OTHER PUBLICATIONS

"ATM Service Access Multiplexer (SAM) Generic Requirements", *GR–2842–CORE*, Issue 2, (Nov. 1996).
"ATM Virtual Path Functionality in SONET Rings—Generic Criteria", *Bellcore Standard GR–2837–CORE*, Issue 3, (Oct. 1996).
Fritz, J., "Bulletproofing ATM: Part 1", *Byte*, 22, 59–60, (Jun. 1, 1997).
May, K.P., et al., "A Fast Restoration System for ATM–ring–based LANS", *IEEE Communications Magazine*, 33, 90–98, (Sep. 1995).
Takase, A., et al., "ATM Transport Node for Flexible and Robust Access Networks", Proceedings of the Global Telecommunications Conference (GLOBECOM), vol. 3, Houston, TX, 1481–1487, (Nov. 29–Dec. 2, 1993).

* cited by examiner

*Primary Examiner*—Wellington Chin
*Assistant Examiner*—Brenda Pham
(74) *Attorney, Agent, or Firm*—Fogg Slifer Polglaze Leffert & Jay, PA

(57) ABSTRACT

A method for controlling the data rate of a virtual connection. Data packets are received for transmission on the virtual connection. The method comprises buffering the data packets in a buffer. A counter signal is generated to indicate the beginning of timeslots in a measurement window. The number of timeslots needed to transmit the data packets with a selected data rate is determined. The method further accesses data from at least one table to determine the spacing between timeslots in the measurement window used to request access to a data bus based on the number of timeslots needed to achieve the selected data rate. Further, access to a data bus for the data packets in the buffer is requested based on the data accessed from the table. The method further transmits the packets when access to the bus is granted.

14 Claims, 5 Drawing Sheets

CIRCUIT AND METHOD FOR SHAPING TRAFFIC IN A VIRTUAL CONNECTION NETWORK

TECHNICAL FIELD OF THE INVENTION

The present invention relates generally to the field of communications and, in particular, to a circuit and method for shaping traffic in a virtual connection network.

BACKGROUND OF THE INVENTION

Conventionally, telecommunications services have been provided to subscribers using dedicated channels. That is, for each call, the telecommunications network establishes a pipeline that is not shared with other calls. As technology has improved, the telecommunications systems have adopted various time division multiplexing techniques to allow a number of connections to contemporaneously use the same physical channel. In recent years, virtual connection technology, e.g., Asynchronous Transfer Mode and Frame Relay, has been developed to allow even more efficient use of bandwidth in a telecommunications system.

With a virtual connection, several users share the same physical circuit. Data is transmitted over the virtual connection in data packets or cells. The data packets each have a source address and a destination address that indicate the endpoints of the virtual connection. One typical characteristic of such virtual connections is that the traffic is "bursty." This means that the rate at which data is transmitted changes with time. To compensate for potential problems caused by the bursty nature of such virtual connections, conventional systems that use virtual connections typically include traffic shapers. The traffic shapers smooth out the data rate so as to be more uniform despite fluctuations in the rate at which the endpoints provide data to the virtual connection. One problem with conventional shapers is that floating point calculations are typically used to control the data rate.

For the reasons stated above, and for other reasons stated below which will become apparent to those skilled in the art upon reading and understanding the present specification, there is a need in the art for an improved traffic shaper for virtual circuit connections.

SUMMARY OF THE INVENTION

The above mentioned problems with traffic shapers and other problems are addressed by the present invention and which will be understood by reading and studying the following specification. A traffic shaper is described which selectively allocates timeslots to a virtual connection in a measurement window.

In particular, an illustrative embodiment of the present invention includes a method for controlling the data rate of a virtual connection. The method includes buffering data packets in a buffer. The data packets are received for transmission on the virtual connection. A counter generates a signal that indicates the beginning of timeslots in a measurement window. The number of timeslots needed to transmit the data packets with a selected data rate is determined. Data is accessed from at least one table to determine the spacing between timeslots in the measurement window used to request access to a data bus based on the number of timeslots needed to achieve the selected data rate. Access to a data bus is requested for the data packets in the buffer based on the data accessed from the table. The packets are transmitted when access to the bus is granted.

In another embodiment, a traffic shaper that delivers data packets from at least one traffic source to a virtual connection network at a substantially uniform rate is provided. The traffic shaper includes a buffer that receives packets from the at least one traffic source. A counter is also included that indicates the beginning of each of a number of timeslots over a selectable time period. A request generator creates request signals that request timeslots for transmitting data out of the buffer. The requests are distributed over the time period based on at least one table so as to establish a desired data rate for the traffic source.

In another embodiment, a method for allocating time slots to shape a stream of data packets is provided. The method includes receiving a request to establish a virtual connection with a selected data rate. The number of requests needed in a sector of a measurement window of timeslots to achieve the selected data rate is determined. Requests for timeslots for the sector are generated according to a stored pattern. The steps of determining and generating are repeated until each sector of the measurement window has been processed.

In another embodiment, a traffic shaper that allocates time slots to shape a stream of data packets is provided. The traffic shaper includes means for receiving a request to establish a virtual connection with a selected data rate. The traffic shaper also includes means for determining the number of requests needed in each sector of a measurement window of timeslots to achieve the selected data rate. Finally, the traffic shaper includes means for generating requests for timeslots for each sector according to a stored pattern based on the selected data rate.

DETAILED DESCRIPTION OF THE INVENTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and-scope of the present invention. The following detailed description is, therefore, not to be taken in a limiting sense.

Figure 1:
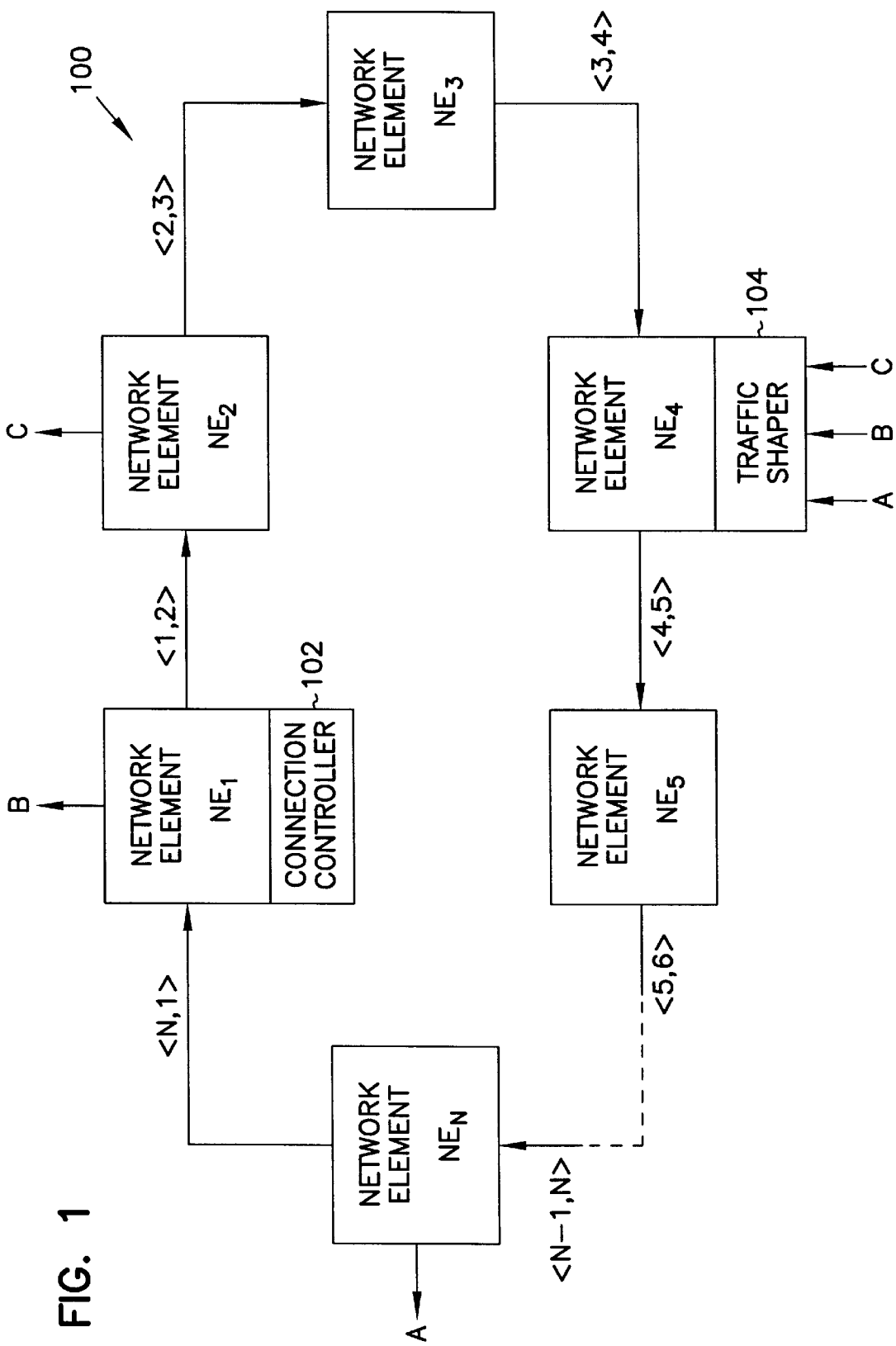
FIG. 1 is a block diagram of an embodiment of a communication network with a traffic shaper according to the teachings of the present invention.

FIG. 1 is a block diagram of an illustrative embodiment of the present invention. Network 100 is a closed-loop, ring network that is formed by a unidirectional connection of network elements NE, through NET. Network 100 transmits data packets or cells between endpoints, e.g., terminals, associated with the network elements over virtual connections using, for example, asynchronous transfer mode (ATM), frame relay, or any other appropriate conventional virtual connection protocol. Network elements $NE_1$ through $NE_n$ may comprise, for example, virtual path add/drop multiplexers that operate on virtual connection packets.

Network 100 comprises a number of "ring segments." A ring segment is defined as a link that carries data packets or cells in a unidirectional path between two adjacent network elements. Each ring segment in FIG. 1 is denoted by the expression<first network element, second network element>wherein the first network element and the second network element are adjacent network elements in network 100 in the direction of traffic flow around the network. For example, the ring segment connecting network element $NE_1$ to network element $NE_2$ is denoted <1,2>.

Communication over network 100 is accomplished through virtual connections between "endpoints." Each virtual connection begins with a "traffic originating endpoint" and terminates at a "traffic terminating endpoint." The traffic originating endpoint adds traffic or data packets onto network 100 and the traffic terminating endpoint drops the traffic from network 100. There can be many traffic originating endpoints on each network element of ring network 100. Each traffic originating endpoint can be viewed as a single traffic source. Alternatively, a group of traffic originating endpoints can be viewed as one traffic source by multiplexing the traffic originating endpoints into a single virtual connection. In this case, the packets from each of the endpoints in the group terminates at endpoints on a common network entity. In other words, the virtual connections for each of the traffic originating endpoints in the traffic source span the same ring segments of network 100. It is also noted that each network entity supports multiple traffic terminating endpoints.

Typically, virtual connections are "bursty." This means that the rate at which packets are placed onto the virtual connection will vary over time. The bandwidth used to describe a traffic originating endpoint or source is typically a mean value of the required bandwidth of the endpoint. Two parameters are used conventionally to define the subscribed bandwidth for a virtual connection: a peak rate (PR), and a sustained rate (SR). The peak rate is the maximum bit rate at which data can be placed on network 100 by an associated traffic originating endpoint. The sustained rate is the average bit rate at which data is added to network 100 by the associated endpoint. When multiple endpoints are grouped into a traffic source, the allocated bandwidth for the traffic source can be less than the sum of the subscribed bandwidths of all of the endpoints in the associated group. This is represented mathematically in equation 1, wherein a group j can consist of endpoints labeled 1 through l.

$$B_j \le \sum_{i=1}^{l} PR_i \text{ and } B_j \le \sum_{i=1}^{l} SR_i \quad (1)$$

This grouping of endpoints into a single traffic source with a bandwidth allocation that is less of the sum of the subscribed bandwidth of each of the endpoints is referred to as "statistical multiplexing" in virtual circuit applications.

Each endpoint can be controlled or throttled to only deliver data packets with a selected bandwidth onto network 100. In other words, data from a traffic source can be placed on to network 100 at an approximately uniform or constant rate even though the rate that the data is produced by the traffic source may vary over time. This is referred to as "traffic shaping" or "smoothing." This function is performed for connections A, B, and C in FIG. 1 by traffic shaper 104.

Traffic shaper 104 delivers data packets from at least one traffic source to virtual connection network 100 at a substantially uniform rate. The physical facility of network 100 may comprise, for example, a bus, a fiber optic cable, a coaxial cable, wireless medium or other appropriate communication medium for transmitting the data packets between endpoints. Traffic shaper 104 uses a timeslot allocation mechanism to perform the traffic shaping function. Each timeslot represents a time period required to transmit K bits over the physical facility of network 100. For a facility that supports a data rate of X bits per second, there can be X/K slots per second. The value of K can be selected so that X/K is an integer value.

To deliver data at approximately a uniform data rate, a measurement window W is used. Each measurement window includes D timeslots and each timeslot represents X/D bits per second. To allocate a specific data rate to a traffic source, the traffic shaper determines how many of the D timeslots in a window, W, to allocate to the traffic source. The number of time slots, N, required to meet a specified data rate, DR, is determined according to the following formula:

$$N = \left\lceil DR \times \frac{D}{X} \right\rceil \quad (2)$$

The traffic shaper then allocates the number of timeslots needed, N, over the available timeslots, D, in each measurement window so as to establish a substantially uniform data rate. Further, the traffic shaper allocates the N timeslots substantially uniformly across the measurement window to create the substantially constant data rate.

Figure 2:
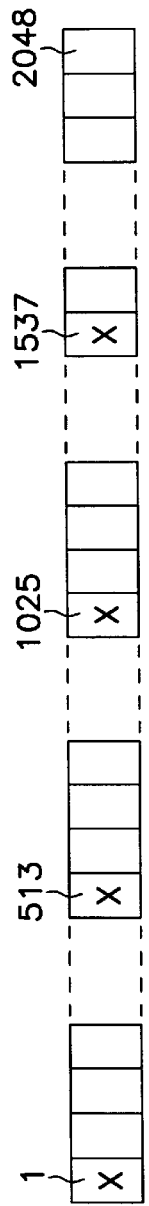
FIG. 2 is a schematic representation of a measurement window with 2048 timeslots.

For example, FIG. 2 shows a measurement window with 2048 timeslots. In this example, 4 timeslots are allocated to the traffic source, namely timeslots 1, 513, 1025, and 1537. If the physical medium of network 100 supports a data rate of 155 Mbps, e.g., an OC-3 line, then each timeslot represents approximately 75.68 kpbs and the four timeslots allocated to the traffic source provides a data rate of 302.72 kbps.

Figure 3:
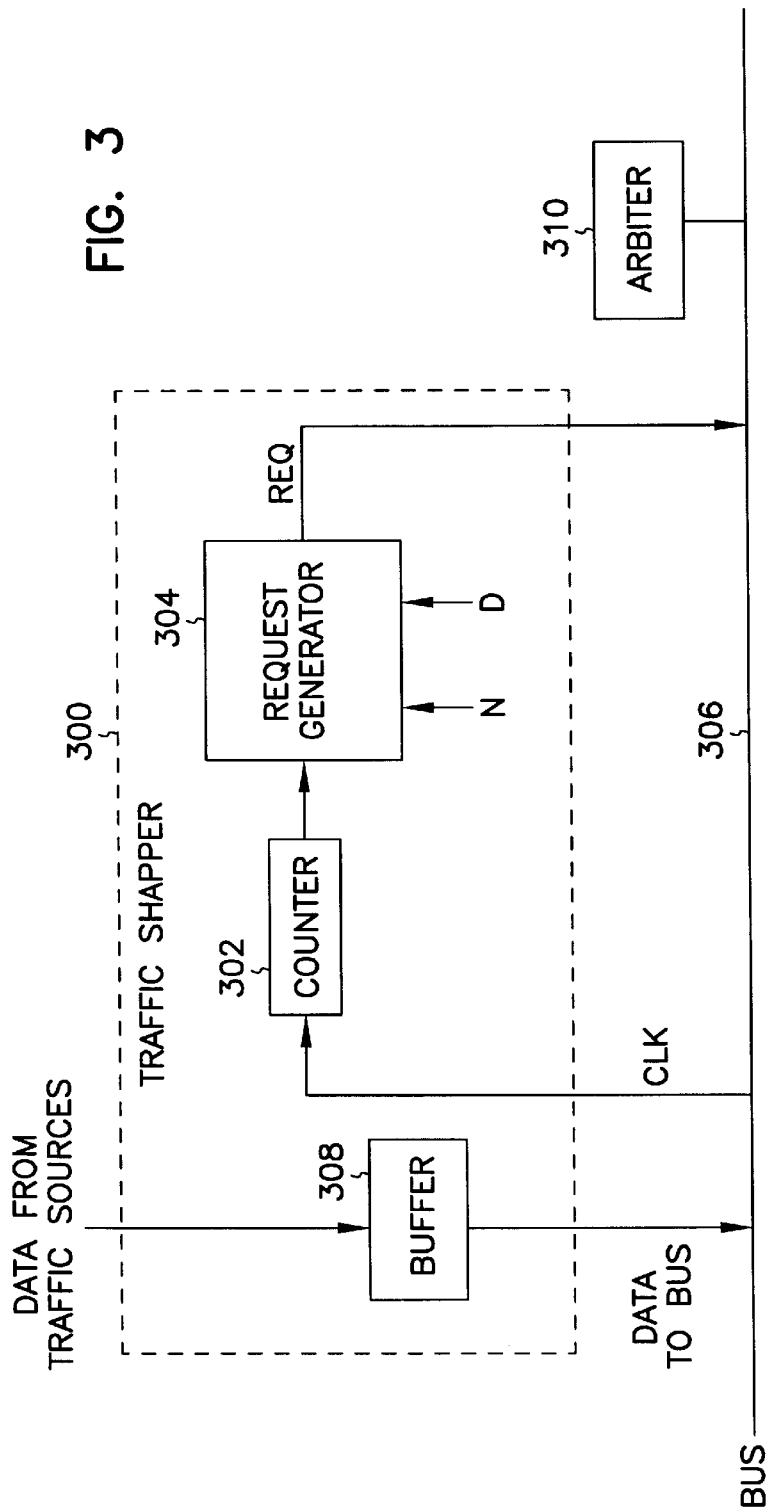
FIG. 3 is a block diagram of an embodiment of a traffic shaper according to the teachings of the present invention.

FIG. 3 is a block diagram of an embodiment of a traffic shaper, indicated generally at 300, according to the teachings of the present invention. Traffic shaper 300 implements a timeslot allocation mechanism that delivers data packets from a source to bus 306 such that the packets are placed on bus 306 at a substantially uniform rate. The data packets from the source may be temporarily stored in buffer 308 while waiting for an allocated time slot on bus 306.

The time slot allocation mechanism is controlled by request generator 304 of traffic shaper 300. Request generator 304 receives input signals N, D, and a signal from counter 302. Request generator 304 uses these input signals to determines when to request access to the bus such that data packets can be transmitted at a desired uniform rate to bus 306. The signal N represents the number of timeslots needed to achieve the desired data rate and the signal D represents the number of timeslots in a given measurement window. Counter 302 generates a signal based on a clock signal from bus 306. Essentially, counter 302 generates pulses that indicate the beginning of each timeslot in a measurement window. Arbiter 310 is provided to coordinate access to the bus when more than one traffic shaper requests access to the bus at a given time.

In operation, traffic shaper 300 receives data packets from a source and provides the data packets to bus 306 with a substantially uniform rate even though the data packets may have been received by shaper 300 with a non-uniform rate. Shaper 300 stores received data packets in buffer 308. The data packets are provided to bus 306 in time slots. To place a data packet on bus 306 in a particular time slot, shaper 304 generates a request for access to bus 306. The request is processed by arbiter 310. When a request is granted, a data packet from buffer 308 is placed on the bus.

Request generator 304 sets the effective data rate for shaper 300. Request generator 304 generates a number of requests for access to bus 306 in a specified time window. The number of requests in the time window is set by the signal N. Further, the duration of the window is established by the signal D. The number of requests needed for a specified data rate is determined, for example, according to equation (2) above. Request generator 304 attempts to evenly distribute the requests for access to the bus over the duration of the window.

Figure 4:
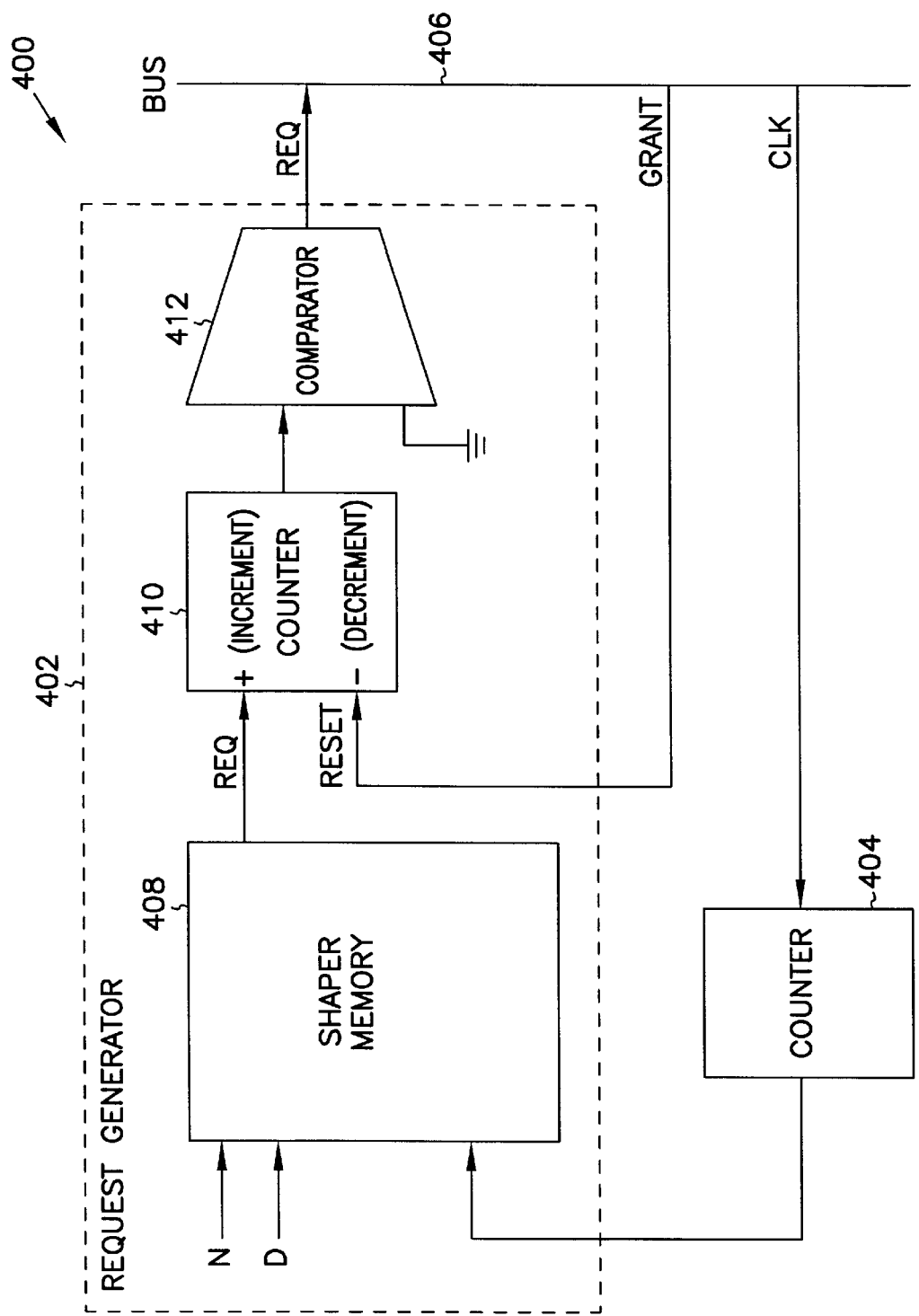
FIG. 4 is a block diagram of another embodiment of a traffic shaper according to the teachings of the present invention.

FIG. 4 is a block diagram of another embodiment of the present invention. Traffic shaper 400 includes request generator 402 and counter 404. Counter 404 receives a clock signal from bus 406 and provides an input signal to request generator 402. Request generator 402 further provides request signals to bus 406 and receives grant signals from bus 406.

Request generator 402 includes memory 408, e.g., a read only memory (ROM) or other appropriate data storage device. Memory 408 stores a table that indicates the number (N) and spacing of requests for a given number of timeslots D for achieving a desired data rate. In one embodiment, memory 408 can be conceptualized as having D rows of data. Each row represents a sequence of requests spaced out over D the timeslots. For example, within a given row, each memory cell of memory 408 contains a value that indicates whether a given timeslot corresponds to a request, e.g., a high logic value, or no request, e.g., a low logic value. In the row with N equal to four requests, memory cells 1, 513, 1025, and 2048 in the row contain a high logic value and the remaining cells contain low logic values.

Counter 410 and comparator 412 control access to bus 406 when multiple traffic sources request access to bus 406 at the same time. Counter 410 is incremented when a request signal is output from memory 408. Counter 410 provides an output signal to comparator 412. Comparator 412 essentially determines whether the value from counter 410 is a low logic value. If not, comparator 412 produces a request signal for bus 406. This indicates that a request has not been granted yet. Once the request is granted, counter 410 is decremented. The request is granted either because no one is sending data, the timeslot is available or the timeslot was granted to this source based on arbitration. When comparator 412 receives a low logic value, this means that all pending requests have been granted. Comparator 412 brings the request signal back to a low logic level to await the next request signal from memory 408. Counter 410 can be limited to a selected value such that transmitted data will not exceed a burst tolerance.

Figure 5:
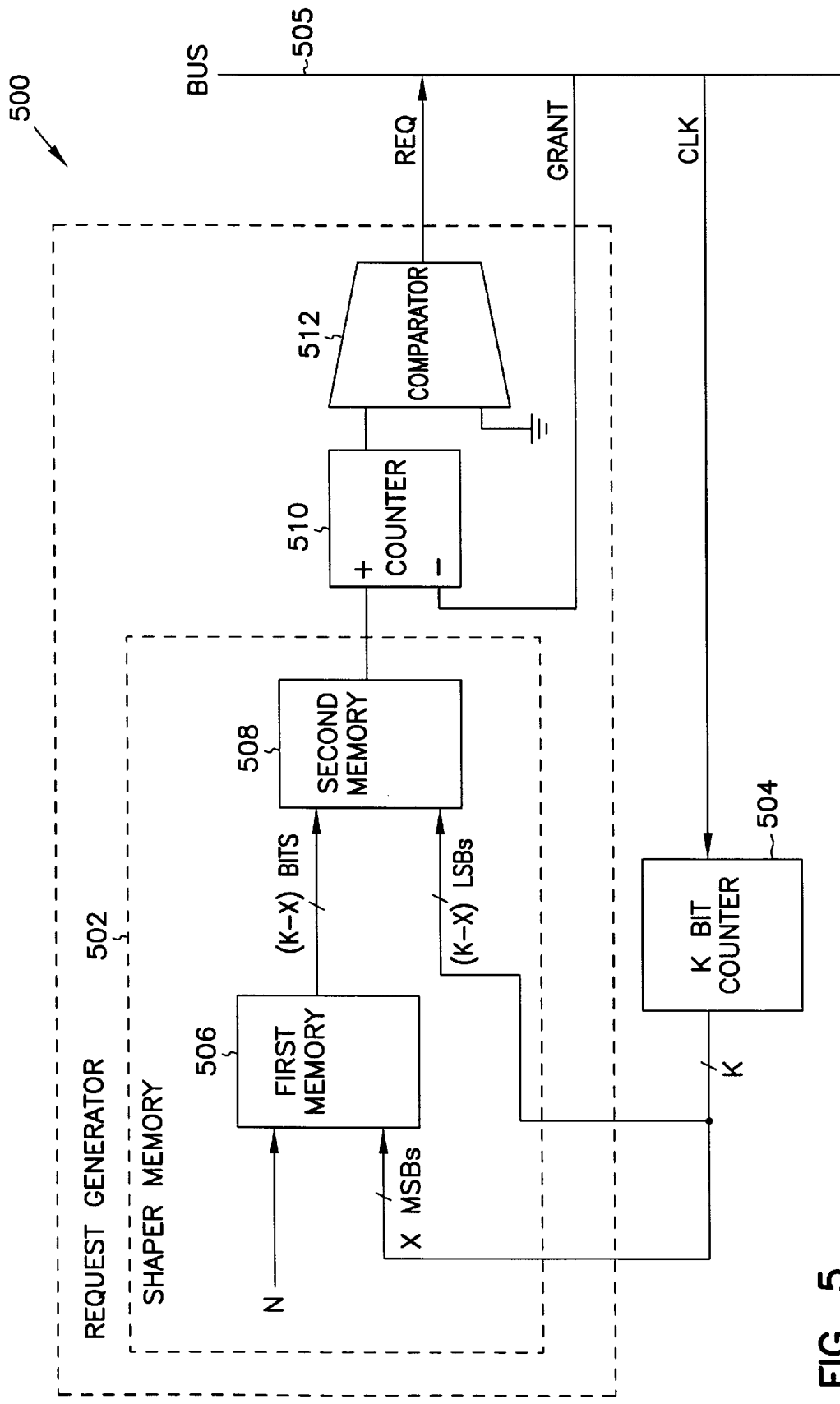
FIG. 5 is a block diagram of another embodiment of a traffic shaper according to the teachings of the present invention.

FIG. 5 is a block diagram of another embodiment of the present invention. In this embodiment, traffic shaper 500 uses an approximation that takes advantage of the repetitive nature of the requests produced by request generator 502. This approximation allows a substantial reduction in the size of the memory needed to store a request sequence for a measurement window of a given size. Specifically, a measurement window can be divided into a number of "sectors." A subset of the total requests needed to generate a selected data rate is then generated for each sector. Advantageously, the request generator generates requests for each sector using the same data from the memory. Thus, a large decrease in memory capacity required for request generator 502 can be achieved by selectively determining how many sectors into which the measurement window is divided.

This "sector" approach is implemented in traffic shaper 500 of FIG. 5 by using first and second memories 506 and 508, e.g., read only memories (ROMs) or other appropriate memory devices. Second memory 508 stores sequences of high and low logic levels that allow any number of requests, from zero to the number of timeslots in a sector of the measurement window, to be generated for a given sector. For example, memory 508 includes a number of rows of data equal to the number of timeslots in the measurement window. Each row includes a different number of requests that are spread out substantially evenly over the sector. First memory 506 supplies a number that selects the row of memory 508 to be used for a given sector so that the total number of requests needed for a measurement window is generated. Essentially, memory 506 stores a value for each sector of a window that indicates the number of requests to be generated in that sector so as to achieve a desired data rate.

Counter 504 produces an output signal with K bits. The number of bits, K, corresponds to the number of timeslots in a measurement window. Thus, the output of counter 504 steps request generator 502 through the timeslots of the measurement window. In this embodiment, the output signal of counter 504 is divided into two signals. Specifically, counter 504 provides the X most significant bits (MSBs) output from counter 504 to first memory 506. These bits indicate the current sector of the measurement window for which request generator 502 is generating request signals. The remaining portion of the output of counter 504 is supplied to second memory 508. These bits effectively indicate when each timeslot begins within a given sector. For example, within a given row, each memory cell of memory 508 contains a value that indicates whether a given timeslot corresponds to a request, e.g., a high logic value, or no request, e.g., a low logic value. In the row with N equal to four requests, memory cell 1 in the row contains a high logic value and the remaining cells contain low logic values.

Counter 510 and comparator 512 control access to bus 505 when multiple traffic sources request access to bus 505 at the same time. Counter 510 is incremented when a request signal is output from memory 508. Counter 510 provides an output signal to comparator 512. Comparator 512 essentially determines whether the value from counter 510 is a low logic value. If not, comparator 512 produces a request signal for bus 506. This indicates that a request has not been granted yet. Once the request is granted, counter 510 is decremented. The request is granted either because no one is sending data, the timeslot is available or the timeslot was granted to this source based on arbitration. When comparator 512 receives a low logic value, this means that all pending requests have been granted. Comparator 512 brings the request signal back to a low logic level to await the next request signal from memory 508. Counter 510 can be limited to a selected value such that transmitted data will not exceed a burst tolerance.

Finally, a signal, N, is provided to first memory 506 that indicates the number of requests needed to create a desired data rate. Based on this number and the X most significant bits of counter 504, first memory 506 passes a number with K-X bits to second memory 508 so as to identify the number of requests to be generated in a given sector so as to produce the desired data rate.

In one embodiment, the request generator has a measurement window with 2048 timeslots. In this embodiment, the measurement window is divided into 8 sectors. Each sector thus represents 256 timeslots. To implement this scheme, an 11 bit counter is used. The three most significant bits of counter 504 are use to indicate the current sector being processed by request generator 502. The remaining 8 least significant bits of counter 504 count through the 256 timeslots in each sector for second memory 508. Further, first memory 506 supplies an 8 bit number, between zero and 255, that indicates the number of requests to be spaced out over the sector of the measurement window.

In this embodiment, first memory 506 stored approximately 128 kilobits of information. This can be thought of as an array of 16,384 rows (16K) of 8 bit numbers. The 8 bit numbers determine how many requests second memory 508 is instructed to produce in a given sector. Further, the 16,384 rows correspond to eight rows (one per sector) for each value of N between 0 and 2047.

Thus, as counter 504 steps through its range from zero to 2047, first memory 506 steps through its values based on the total number of requests to be generated for a specified data rate. These eight values are supplied in turn to second memory 508 which uses the numbers to determine the number and spacing of the requests in each sector of the measurement window.

Advantageously, the use of two memories in this embodiment produces a substantial savings in the size of the memory required to implement the requestor circuit as compared with the requester circuit of FIG. 4. For example, with a timeslot window with 2048 timeslots, the memory of FIG. 4 would require approximately 87 square millimeters of silicon to be realized. In the circuit of FIG. 5, a 2048 timeslot system can be implemented with the two memories, e.g., ROMs, using only about 4 square millimeters of silicon. The tradeoff is that, in some instances, the requests will not be as evenly distributed over the 2048 timeslots in the measurement window.

Figure 6:
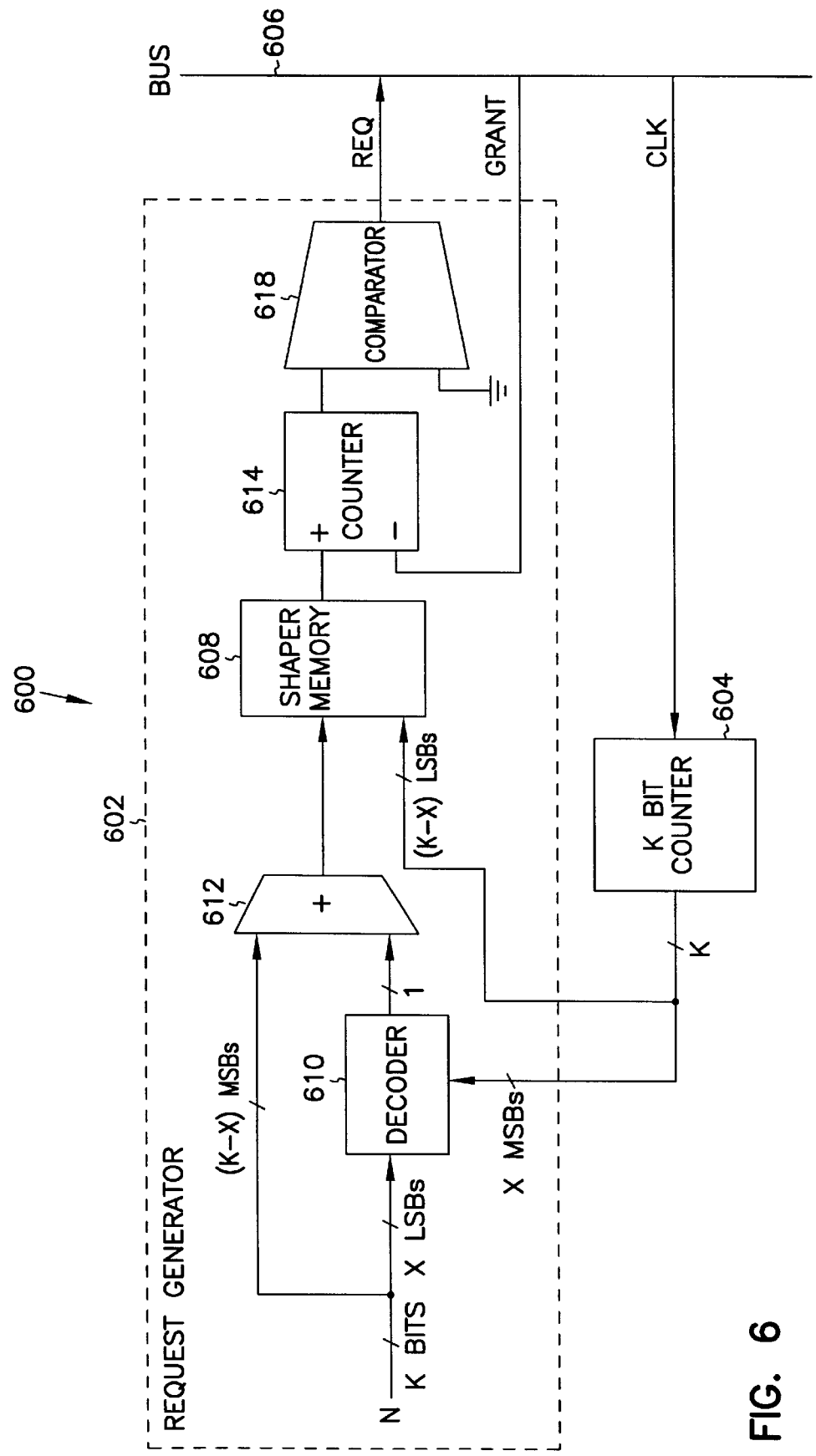
FIG. 6 is a block diagram of another embodiment of a traffic shaper according to the teachings of the present invention.

FIG. 6 is a block diagram that illustrates another embodiment of the present invention. As with the embodiment of FIG. 5, traffic shaper 602 uses a sector approach to distribute requests over a measurement window. In this embodiment, counter 604 and ROM 608 function in substantially the same manner as counter 504 and second memory 508 of FIG. 5. In this embodiment, first memory 506 is replaced with decoder 610 and adder 612. Decoder 610 and adder 612 work in combination to determine how many requests to generate in each sector of a measurement window.

Request generator 602 essentially performs a rough estimate of the number of requests to generate in each sector by "dividing" the number of requests needed, N, by the number of sectors, $2^X$. This is accomplished by removing the X least significant bits of the number N. The remaining K-X bits represents the integer value of this division operation. These K-X bits provide the base amount of requests that will be generated for each sector of the measurement window.

The remainder of the division operation, i.e., the X least significant bits, are fed to decoder 610. Decoder 610 also receives the X most significant bits from counter 604. Decoder 610 produces an offset (e.g., 0 or 1) for each sector, based on the remainder, such that the additional requests needed to make up the number of requests N are evenly distributed over the sectors of the measurement window. For example, when the number of requests needed to achieve a desired data rate is 11 out of 2048 timeslots in an implementation with 8 sectors, the embodiment will produce at least one request per sector (11 divided by 8). The 3 least significant bits of the signal N cause decoder 610 and adder 612 to add one request to three of the eight sectors. For the other five sectors, decoder 610 and adder 612 do not add additional requests over and above the one base request for each sector. Adder 612 adds the output of decoder 610 to the base number of requests indicated by the 8 most significant bits of the signal N. In this case, adder 612 produces a value of "1" for five of the sectors and a "2" for three of the sectors such that the total number of requests is 11.

Counter 614 and comparator 61,8 provide the same functionality as described above with respect to counters 410 and 510 and comparators 412 and 512.

The embodiments have been described in terms of "timeslots." Each timeslot has a duration, Q. The duration of the timeslots determines how many bits can be inserted into a timeslot. For an embodiment that transports Asynchronous Transfer Mode (ATM) data packets or cells, each timeslot should be able to carry at least one ATM cell. Thus the number of bits transported in each cell is 53×8. The duration of a timeslot is calculated by dividing the number of bits by the data rate of the physical facility. In general the duration of a timeslot is calculated according to equation (3):

$$Q = \frac{N}{X} \tag{3}$$

In equation (3), Q is the duration of the timeslots, N is the number of bits in each time slot and X is the data rate of the physical facility used to transport the data packets.

In another embodiment, the size of the measurement window can be varied by applying a scaler so as to control or modify the number of bits carried in each timeslot. The total number of timeslots in a measurement window is maintained at a constant value W. Thus, this embodiment can achieve a finer resolution in the data rate for a given number of bits in a measurement window. The selected scaler for a particular traffic source has to guarantee that there is sufficient bandwidth allocated to the traffic source so as to handle the maximum bandwidth that the source can send after the scaler is applied. Thus, the scaler, S, must satisfy equation (4):

$$S = \left\lceil \frac{X}{Y} \right\rceil \tag{4}$$

In equation (4), Y is the maximum data rate from the traffic source and X is the data rate of the physical medium. Since each source that is coupled to a traffic shaper may have a different maximum data rate, each traffic source may have its own scaler. When a scaler is used, the number of timeslots, NT, to be allocated to a traffic source is calculated according to equation (5):

$$NT = \left\lceil DR \times \frac{W \times S}{X} \right\rceil \tag{5}$$

In equation (5), DR is the delivery rate, S is the scaler, W×S is the number of timeslots in the "expanded" measurement window.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the number of timeslots in the measurement window can be altered without departing from the spirit and scope of the present invention. Further, the number of sectors used with the embodiments of FIGS. 5 and 6 can be altered as well, although the number of sectors should be a power of two.

What is claimed is:

1. A method for controlling the data rate of a virtual connection, the method comprising:

buffering data packets in a buffer wherein the data packets are received for transmission on the virtual connection;

generating a counter signal that indicates the beginning of timeslots in a measurement window;

determining the number of timeslots needed to transmit the data packets with a selected data rate;

accessing data from at least one table to determine the spacing between timeslots in the measurement window used to request access to a data bus based on the number of timeslots needed to achieve the selected data rate;

requesting access to a data bus for the data packets in the buffer based on the data accessed from the table; and transmitting the packets when access to the bus is granted.

2. The method of claim 1, and further comprising:

incrementing a counter when access to the data bus is requested;

decrementing the counter when access to the data bus is granted; and repeating the request for access to the data bus when the counter is a non-zero value.

3. The method of claim 1, wherein the step of accessing data from at least one table comprises the step of accessing data from a single table that stores data for the spacing between timeslots over the entire range of the measurement window based on the number of requests needed to achieve the selected data rate.

4. The method of claim 1, wherein the step of accessing data from at least one table comprises:

determining the number of requests for a sector of the measurement window; and determining the spacing of the requests in the measurement window.

5. The method of claim 4, wherein the step of determining the number of requests for a sector comprises looking up in a first table the number of requests needed based on the sector and the total number of requests needed to achieve the selected data rate.

6. The method of claim 4, wherein the step of determining the number of requests for a sector comprises:

dividing the total number of requests needed by the number of sectors;

determining the remainder from the step of dividing;

determining the spacing of the remainder across all sectors; and selectively adding the remainder to the number of requests for a sector.

7. The method of claim 1, and further comprising scaling the size of the measurement window based on the selected data rate.

8. A traffic shaper that delivers data packets from at least one traffic source to a virtual connection network at a substantially uniform rate, the traffic shaper comprising:

a buffer that receives packets from the at least one traffic source;

a counter that indicates the beginning of each of a number of timeslots over a selectable time period; and a request generator that creates request signals that request timeslots for transmitting data out of the buffer, wherein the requests are distributed over the time period based on at least one table so as to establish a desired data rate for the traffic source.

9. The traffic shaper of claim 8, wherein the counter is scalable to adjust to a desired measurement window size.

10. The traffic shaper of claim 8, wherein the request generator comprises a read only memory that is programmed with data that indicates when to make requests based on the number of requests needed to meet the desired data rate and based on the number of timeslots in the window.

11. The traffic shaper of claim 8, wherein the request generator further includes a counter that is incremented when a request is generated such that the request is repeated until it is granted.

12. The traffic shaper of claim 8, wherein the request generator comprises:

a K bit counter;

a first memory that determines the number of requests to be made over a sector of timeslots based on the total number of requests to be generated and based on the X most significant bits of the counter; and a second memory that determines the spacing of the requests in the sector based on the output of the first memory and the (K-X) least significant bits of the counter.

13. The traffic shaper of claim 8, wherein the request generator comprises:

a K bit counter, wherein the X most significant bits of the counter differentiate between a number of segments of the time window;

a decoder that uses the X least significant bits of a signal that indicates the number of requests needed to achieve the desired data rate and uses the X most significant bits of the counter to identify a number of additional requests needed in each segment of the time window;

an adder that adds the output of the decoder with the (K-X) most significant bits of the signal that indicates the number of requests needed to achieve the desired data rate so as to generate a number that indicates the number of requests needed for each segment of the time window; and a memory that determines the spacing of the requests in each segment based on the output of the adder and the (K-X) least significant bits of the counter.

14. The traffic shaper of claim 8, wherein the request generator comprises:

a K bit counter;

a decoder coupled to receive a number of bits from the K bit counter and a number of bits from a signal that indicates the number of requests needed to achieve a selected data rate;

an adder coupled to receive a number of other bits from a signal that indicates the number of requests needed to achieve a selected data rate and coupled to receive the output of the adder;

wherein the decoder and the adder determine the number of requests needed in a number of segments of the time window so as to achieve the selected data rate; and a memory coupled to receive the output of the adder and a number of other bits from the K bit counter so as to spread the requests out over each segment of the time window.

* * * * *